Aug. 16, 1966 R. E. FORSYTH ET AL 3,266,617
ACCUMULATING CONVEYER
Filed July 30, 1963 4 Sheets-Sheet 1

INVENTORS.
ROBERT EMIL FORSYTH
JOHN WILLIAM HANCHER
BY
Browne, Schuyler, & Beveridge
ATTORNEYS

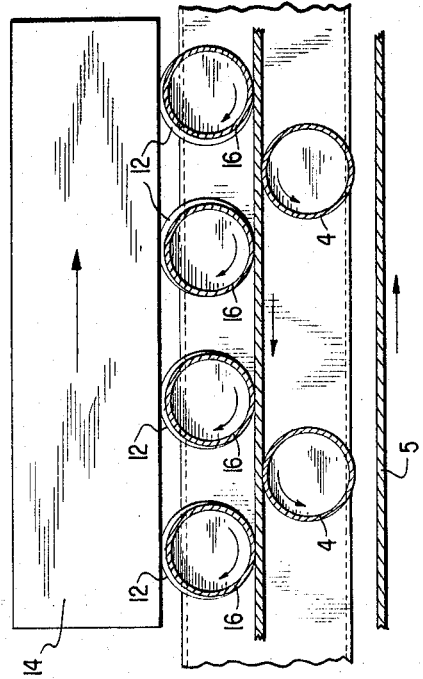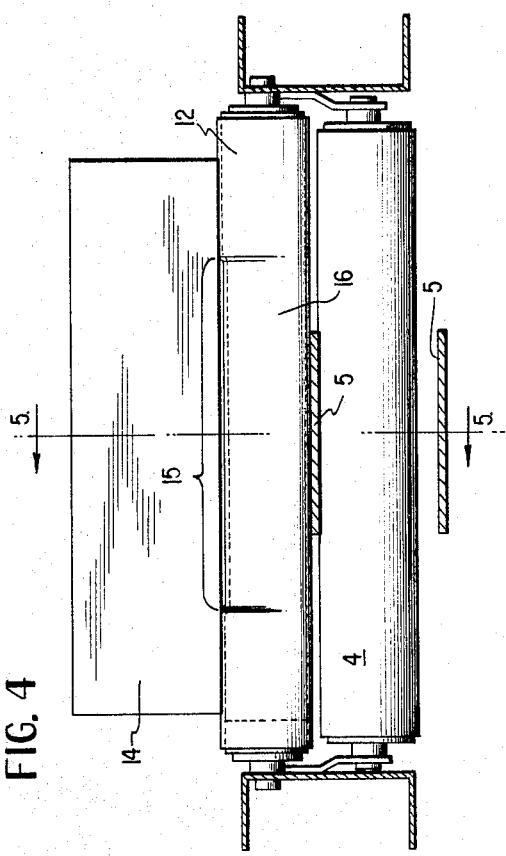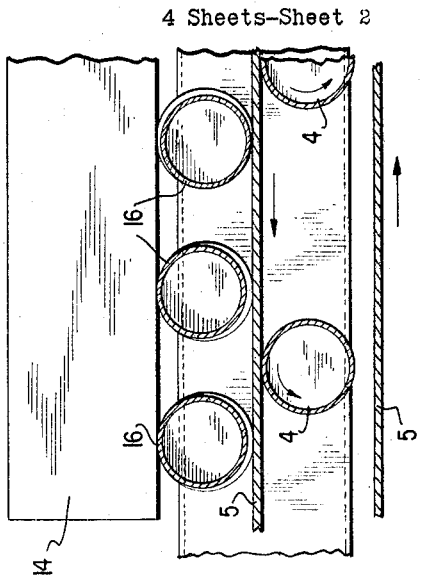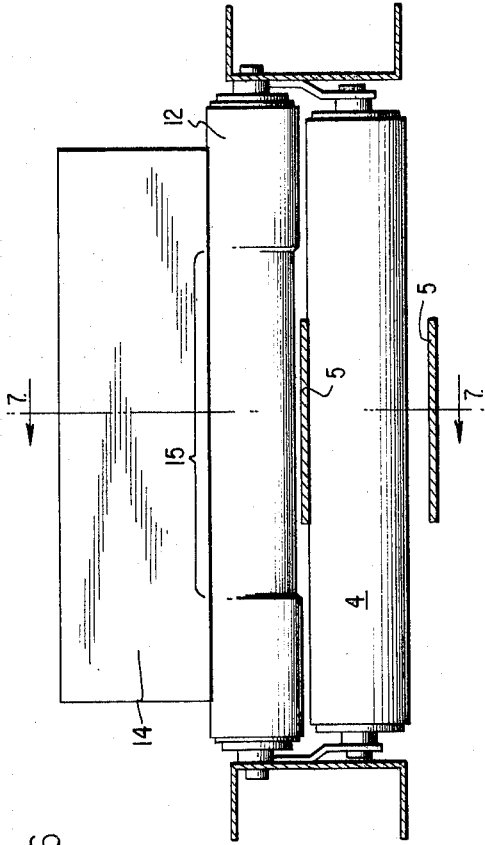

Aug. 16, 1966
R. E. FORSYTH ETAL
3,266,617
ACCUMULATING CONVEYER
Filed July 30, 1963
4 Sheets-Sheet 3
FIG. 8
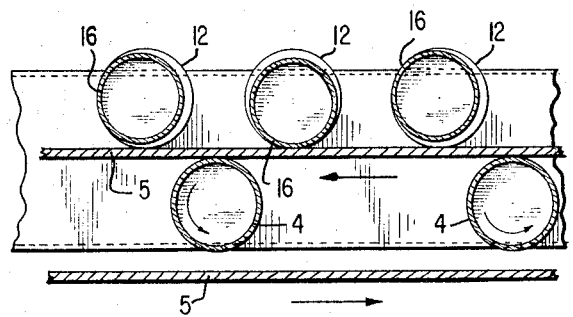
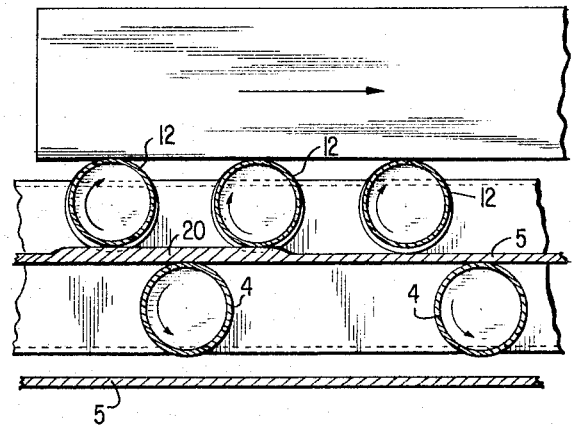
FIG. 11
INVENTORS.
ROBERT EMIL FORSYTH
JOHN WILLIAM HANCHER
BY
*Browne, Schuyler, & Beveridge*
ATTORNEYS.

Aug. 16, 1966  R. E. FORSYTH ETAL  3,266,617
ACCUMULATING CONVEYER

Filed July 30, 1963  4 Sheets-Sheet 4

INVENTORS.
ROBERT EMIL FORSYTH
JOHN WILLIAM HANCHER
BY
Brown, Schuyler, & Beveridge
ATTORNEYS.

United States Patent Office 3,266,617
Patented August 16, 1966

3,266,617
ACCUMULATING CONVEYER
Robert Emil Forsyth and John William Hancher, Ellwood City, Pa., assignors to Mathews Conveyer Company, Ellwood City, Pa., a corporation of Pennsylvania
Filed July 30, 1963, Ser. No. 298,642
11 Claims. (Cl. 198—127)

This invention relates to power driven conveyer systems, and more particularly to a roller conveyer system in which transported articles may be arrested or accumulated at a station on the conveyer line without shutting down the conveyer.

In the material handling field, it is often desirable to convey articles from one station to another, and to permit the articles to remain at the latter station for a period of time without removing them from the conveyer. Often the purpose of such an operation is to permit a number of articles which are delivered at spaced intervals to accumulate at this latter station so that an operation may be performed on a number of them simultaneously. Other times, this accumulation provides a storage place for the articles prior to their removal to another position. In still other cases, it may be desirable to temporarily halt one or more articles on the conveyer line and then continue them on the conveyer with the same or different spacing between the articles.

Heretofore, several problems have been attendant to such operations. One of the major problems has been the build up in line pressure which occurs when the conveyed articles are held stationarily against the conveying force. This pressure is caused by the tendency of the articles on the line to keep moving, and thus exert a force against the preceding articles which impede their movement. Some of the more severe consequences of this pressure can be damage to the articles by vertical and horizontal buckling of the line which can cause articles to be thrown off the line.

Another problem which exists in this area is the damage to the conveyed articles caused by friction between the article and the driven roller. Where the roller is arrested against the force of the driving belt, this wear occurs in the belt.

Still another problem has been the increased load placed on the conveyer driving system when an article is held stationarily against the conveying force. This load increase, which far exceeds the force required to run the conveyer under normal conditions, necessitates the use of a high power source with an attendant increase in the cost of installation and operation.

While some accumulating systems have been proposed which tend to overcome these problems, these have generally been expensive, limited in the type of article to be conveyed, complicated and unreliable. This invention, on the other hand, offers a solution which is practical, versatile and inexpensive.

It is therefore an object of this invention to provide an article accumulating conveying system in which articles may be accumulated on the conveyer line without appreciably increasing line pressure on the conveyed articles.

It is another object of this invention to provide a roller conveyer system in which the rotative force delivered to any one roller may be varied independently of the rotative force delivered to any other roller.

It is another object of this invention to provide an article accumulating conveying system in which articles may be easily halted on the line, accumulated without substantially increasing the static load on the power source, and restarted through any one of several simple operations.

It is another object of this invention to provide a powered conveyer system which can accumulate articles having wide variation in weight, shape and size.

It is another object of this invention to provide a powered conveyer system having accumulating capabilities which are simple, reliable and inexpensive.

In accomplishing the foregoing objects, a principal feature of the invention resides in the provision, in a roller conveyer system in which the individual rollers are rotated by a driving belt passing beneath the rollers along a direction corresponding to the conveyer path, of a plurality of rollers having eccentric surfaces contoured so that the force of engagement between the roller and the driving belt will vary according to the roller's rotative position. The surface of maximum engagement force represents only a small portion of the total surface of the rollers, and the rotative force imparted by the driving belt to the remaining surface will be insufficient to rotate the roller when a stationary article is on it. However, when a slight additional force is delivered to the roller, as by an article being passed from an adjacent roller, this added impetus will be sufficient to rotate the roller, and the intermittent engagement of the maximum engagement force surface of the roller by the driving belt will be sufficient to maintain rotation until the article passes. Accumulation of articles may be accomplished by placing an impediment in the conveyer path sufficient to absorb the inertia of the moving article. The affected rollers beneath the arrested articles will be automatically rotated to their minimum pressure position, and the articles will remain at rest until restarted.

Other objects, features and advantages of the present invention will become more apparent from the following detailed description taken in conjunction with the attached drawings in which:

FIG. 4 is a sectional view taken along the lines 4—4 of FIG. 1 showing a belt driven roller conveyer element according to the present invention;

FIG. 5 is a sectional view taken along the lines 5—5 of FIG. 4;

FIG. 6 is a view of the roller conveyer element of FIG. 4, with the roller in a nonengaging position with respect to the driving belt;

FIG. 7 is a sectional view along the lines 7—7 of FIG. 6;

FIG. 8 is a fragmentary sectional view of a number of contour rollers in random load condition;

FIG 11 is a fragmentary sectional view showing another device for actuating a roller independently of its rotative position.

Figure 1:
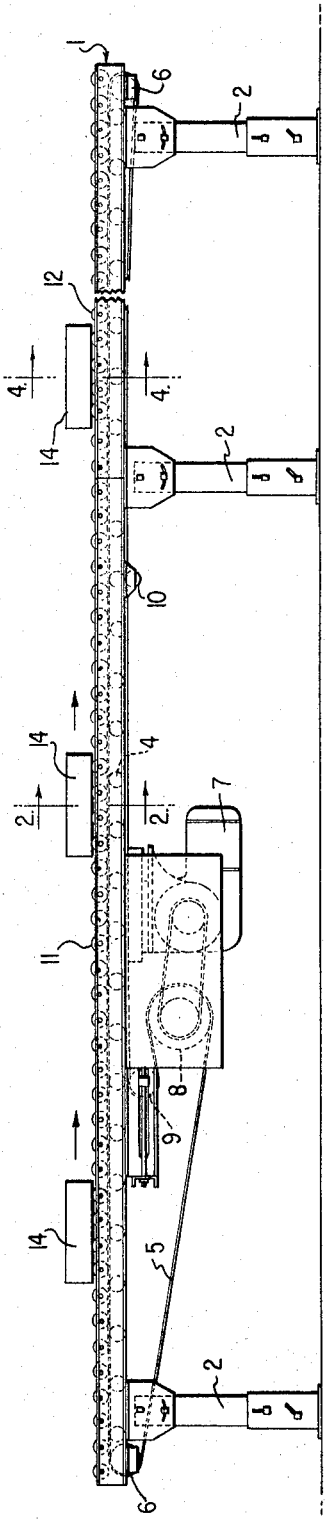
FIG. 1 is a fragmentary side view of a conveyer system according to the invention.

The conveying system is illustrated in FIG. 1 and comprises a rectangular frame 1, supported by legs 2 and having a plurality of driven rollers 11 and 12, which define the conveyer path, and snubbing rollers 4 mounted thereon. A continuous belt 5 is looped over end pulleys 6 of frame 1, passes between driven rollers 11 and 12 and snubbing rollers 4 and is driven by a power source 7 via drive pulley 8. Belt 5 is also strung over pulley 9 which is adjustably mounted under frame 1 for varying belt tension. Lower roller 10 is provided to support belt 5 on its return run.

Figure 3:
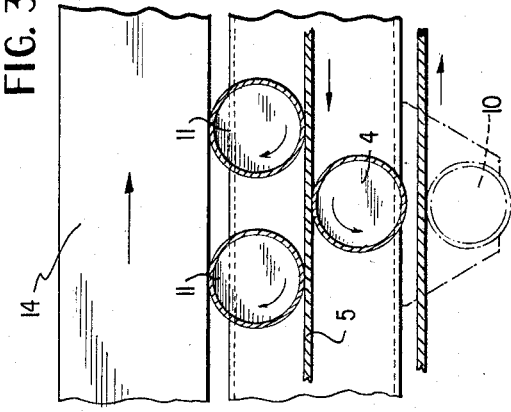
FIG. 3 is a sectional view taken along lines 3—3 of FIG. 2.
Figure 2:
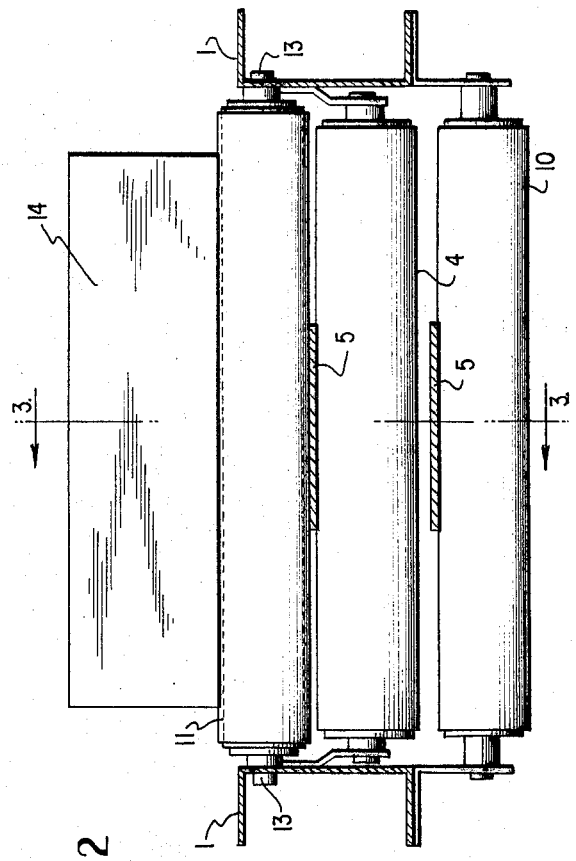
FIG. 2 is a sectional view along the lines 2—2 of FIG. 1 showing a conventional belt driven roller conveyer element.

In the system shown, some of the driven conveyer rollers are of the conventional type 11, shown in FIGS. 2 and 3, and others are of the contoured type 12 according to the invention, as illustrated in FIGS. 4–7. Conventional rollers 11 are cylindrical in shape, rotatably mounted at their ends 13 to frame 1. Suitable bearings are provided to reduce friction at these points. Snubbing rollers 4 are mounted below rollers 11 and urge belt 5 against their lower surface. By virtue of this frictional engagement, movement of belt 5 will cause rotation of roller 11 to move articles 14 along the line. This rotation, however, will occur whether or not there is any load to be conveyed, and any force applied to impede the rotation of roller 11 will be conveyed to belt 5 thereby increasing the load on power source 7. With respect to rollers of this type, power source 7 will always have a static load corresponding to the force required to maintain the rotation of rollers 11.

Unlike conventional rollers 11, contoured rollers 12, illustrated in FIGS. 4–7, have an eccentric belt engaging section 15 which is offset from the rest of the roller. The contour of this section 15 is such that only a portion 16 of its surface is normally engageable by belt 5. Thus roller 12 will be rotatably driven only when it is in a position such that surface portion 16 is adjacent belt 5. The remainder of the time belt 5 will be out of engagement and no force will be transmitted. The driving position of rollers 12 is illustrated in FIGS. 4 and 5, while the nondriving position is illustrated in FIGS. 6 and 7.

Referring now to FIG. 8, when the conveyer is initially put into operation, rollers 12 may be in any random position. Those which are in a driving position will be rotated by belt 5, and while driving surface portion 16 is relatively small (an arc of about 90° has been found to be satisfactory) the intermittent engagement of surface portion 16 with belt 5 will be sufficient to maintain rotation. The actual operation of contour rollers 12 during periods when no article is on them is not critical to the invention, and their behavior may vary according to the parameters of the individual system.

When an article 14 is passed to a roller 12 from an adjacent roller, the kinetic energy of the article will impart an initial rotation to the roller. This initial rotation will be sufficient to move surface portion 16 into engagement with belt 5 whereby contoured roller 12 will be driven, moving article 14 along the line, as is illustrated in FIG. 5. While article 14 is in engagement with a contoured roller 12 its forward movement serves to continue the rotation of that roller 12 until surface portion 16 is re-engaged by belt 5.

Where it is desired to accumulate, rather than convey, articles, a station is provided having a number of contoured rollers 12 sufficient to hold the number of articles to be stopped. The provision of a particular station is, of course, only exemplary, and where the system is composed entirely of contour rollers 12, articles may be accumulated anywhere along the line.

In order to stop articles 14 it is only necessary to place some sort of a barrier in the line. Because the only force which need be absorbed is the momentum of the moving article, this can be done by hand, or retractable barriers. Such barriers are of a conventional type and need not be further described. Once articles 14 have been stopped, referring to FIGS. 6 and 7, any contour rollers 12 beneath them which are in their driving condition will normally continue to be rotated until their driving surface portions 16 leave the belt. The weight of the article will prevent contour roller 12 from counter rotating, and roller 12 will assume its stationary or minimum pressure condition. In connection with the halting of the article, it has been found that using a barrier which has a certain amount of "yield" in the direction of article movement has facilitated the movement of rollers 12 to their minimum pressure condition.

While it has been found in practice that because of such factors as variations in the bottom of the carriers and in the adjustment of snub rollers 4 not all of the contour rollers 12 will be held with their surface portions 16 out of engagement with belt 5, these deviations in the system have proven to be minor and do not detract from the over-all operational purpose of the conveyer. Under ideal conditions, once the articles have been halted the barrier may be removed and because contour rollers 12 are out of engagement with belt 5, the articles will remain stationary.

While articles 14 are stationary, any desired operation may be performed on them, or they may be removed from the line. If it is desired to restart them along the line, any one of several methods may be employed. A slight forward or rearward movement of the article will suffice, or, because it has been found that roller 12 will generally come to a halt shortly after its surface portion 16 has moved from belt 5, a temporary reversal of belt 5 will move surface portion 16 back into engagement, and then a re-reversal will start rollers 12 moving.

Figure 9:
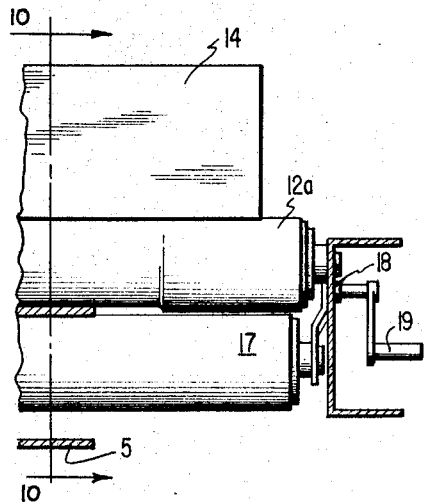
FIG. 9 is a fragmentary view of a roller conveyer element according to the present invention embodying a device for actuating a roller independently of its rotative position.
Figure 10:
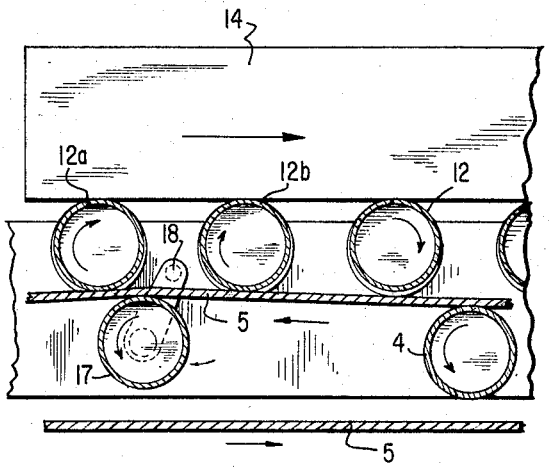
FIG. 10 is a sectional view along the lines 10—10 of FIG. 9.

Still another method of restarting the line is shown in FIGS. 9 and 10. In this illustration, snub roller 17 is rotatably mounted at 18, and by rotating handle 19 snub roller 17 and belt 5 can be moved upwardly until belt 5 engages the nondriving surface of rollers 12a and 12b. The rotation of these rollers will be sufficient to initiate movement of article 14, and the conveying process will take place as previously described.

Simultaneous starting of a number of packages may be accomplished by providing a number of such rotatably mounted snub rollers 17, together with a lever linkage for moving them together.

Where it is desired to restart a number of articles one at a time and at spaced intervals, still another method may be employed. Referring to FIG. 11, belt 5 is shown with a thickened portion 20. As this passes beneath contour rollers 12, it will engage the nondriving portion to rotate the roller and initiate movement of the article. Since only one roller will be engaged at a time, staggered starting of the articles will be accomplished. Spacing of the articles will be dependent upon the spacing of the rollers and the speed of the belt.

It is contemplated that a conveying system according to the invention may be made up entirely of contour rollers 12, or may utilize conventional rollers 11 with contour rollers 12 employed only at an accumulating station, or may employ conventional rollers 11 with contour rollers 12 interspersed along the line. This is so because separate from the accumulating capabilities of contour rollers 12, by virtue of the fact that only a small number of rollers 12 will be engaged by belt 5 at any given time, their use substantially reduces the static load on power source 7 and presents a distinct advantage even to systems in which the accumulating feature may not be desired.

Figure 12:
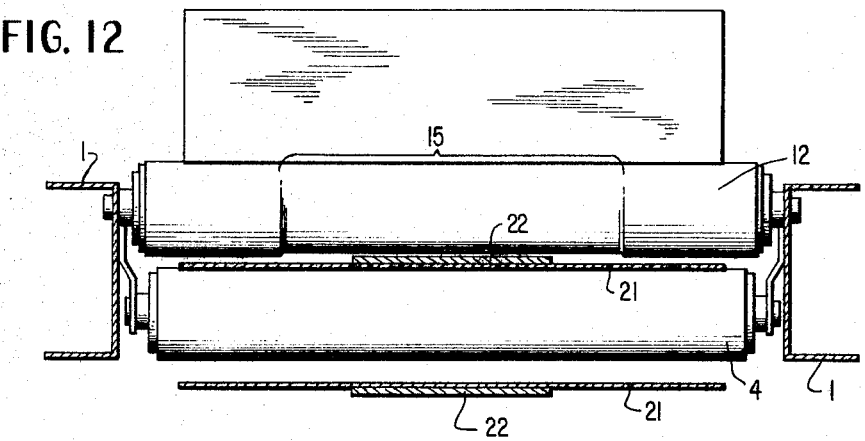
FIGS. 12 and 13 are alternative embodiments of roller conveyer elements according to the present invention.
Figure 13:
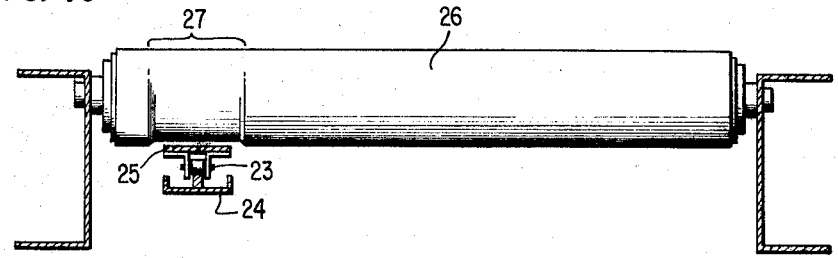

FIGS. 12 and 13 illustrate alternative embodiments of the invention. In FIG. 12 a wide belt 21 is provided having a thickened central portion 22 for engaging the eccentric portion 15. The extra width of belt 21 increases its strength for situations where such strength may be required, while thickened portion 22 obviates the need for making the entire surface of contoured roller 12 eccentric.

Where a belt may prove to be insufficient, a chain drive, as shown in FIG. 13, may be employed. Chain 23 would be mounted on a track 24 and provided with a padded surface 25 for engaging roller 26. While eccentric surface 27 is shown as being located at one side of roller 26, it should be apparent that this position is not critical. Because surface 25 of chain 23 is relatively narrow the width of eccentric surface 27 of roller 26 may be correspondingly reduced.

While certain preferred embodiments have been illustrated, other modifications within the scope of the invention are contemplated. Although rollers having recessed eccentric surfaces have been shown, a similar result may be achieved by using the body of the roller as the nondriving surface and applying a shim to the roller as the driving surface. Another method of achieving this result would be by the use of counterweighted rollers wherein the driving force of the belt would be insufficient to rotate them without the added impetus of the moving articles.

In situations where it may be desired, this invention contemplates the use of such rollers where the driving belt will always be in engagement with the eccentric surface, but the force of such engagement will be varied according to the roller's position.

Although certain preferred embodiments of the invention have been described and ilustrated, it should be understood that the invention is not restricted thereto, but that it is intended to cover all modifications which would be apparent to one skilled in the art and which come within the spirit and scope of the invention.

What is claimed is:

1. In an article conveying and accumulating system including a roller conveyor path and means for applying a rotative force to the rollers, the improvement comprising means on at least one of said rollers for varying the rotative force delivered to said one roller in accordance with the rotative position of said one roller.

2. In the art of conveying and accumulating articles on a conveying path including a plurality of rollers subjected to a rotative force, the improvement comprising the step of varying the rotative force delivered to at least one of said rollers in accordance with the rotative position of said one roller independently of the rotation force delivered to any other of said rollers.

3. In a power driven conveying system in which a plurality of rollers rotatably supported in a frame to define a conveyor path are frictionally engaged and rotated by a driving element, the improvement which comprises the step of varying the degree of frictional engagement between a roller and said driving element in accordance with the rotative position of said roller.

4. A power driven conveying system comprising a frame;
   a plurality of rollers mounted on said frame defining a conveyor path;
   driving means engageable with said rollers to rotate said rollers for propelling material along said conveyer path, said driving means being normally out of engagement with at least selected ones of said rollers;
   each of said selected rollers including means for engaging said driving means responsive to an initial rotation to further rotate said selected rollers, the further rotation of any one of said selected rollers being acomplished independently of the rotation of any other roller.

5. Article handling apparatus comprising
   a frame;
   a plurality of conveying rollers mounted in said frame for rotation about parallel axes and defining a substantially horizontal article conveying surface;
   power means operable to drive said rollers in article conveying rotation about their axes;
   each said conveying roller including variable means for transmitting power from said power means to said roller to induce article conveying rotation of the roller, the power transmitted by said variable means varying in accordance with the rotative position of said roller upon its axes between a minimum insufficient to drive said rollers and a maximum sufficient to maintain articles in motion on said conveying surface.

6. In a live roller conveyer having a frame, a plurality of conveying rollers mounted on said frame for rotation about parallel axes and defining an article conveying surface and power driven belt means frictionally coupled to said conveying rollers for rotating said rollers in article conveying movement;
   the improvement comprising means for varying the degree of frictional coupling between said belt means and a conveying roller in accordance with the rotative position of said roller about its axis between a minimum frictional coupling insufficient to drive the roller in rotation and a maximum frictional coupling sufficient to drive said roller in rotation to convey articles along said conveyer.

7. A power driven conveying system comprising a frame;
   a plurality of roller conveying members rotatably mounted on said frame defining a load conveying surface;
   belt means engageable with said rollers for rotating said rollers to convey articles therealong;
   the surfaces of at least selected ones of said rollers being contoured to present degrees of engagement with said belt means varying with the individual rotative position of said selected rollers whereby the amount of rotative force imparted to any one of said selected rollers will be dependent upon the rotative position of said one selected roller.

8. A power driven conveying system comprising a frame;
   a plurality of roller conveying members rotatably mounted on said frame defining a load conveying surface;
   belt means engageable with said rollers for rotating said rollers to convey articles therealong;
   the surfaces of at least selected ones of said rollers being contoured to present degrees of engagement with said belt means varying with the individual rotative position of said selected rollers whereby the amount of rotative force imparted to any one of said selected rollers will be dependent upon the rotative position of said one selected rollers; and
   means associated with said belt means for varying the rotative force imparted to said rollers independently of the rotative position of said rollers.

9. A power driven conveying system comprising a frame;
   a plurality of roller conveying members rotatably mounted on said frame defining a load conveying surface;
   belt means engageable with said rollers for rotating said rollers to convey articles therealong;
   the surfaces of at least selected ones of said rollers being contoured to present degrees of engagement with said belt means varying with the individual rotative position of said selected rollers whereby the amount of rotative force imparted to any one of said selected rollers will be dependent upon the rotative position of said one selected roller; and
   means operative independently of said roller contours for varying rotative force imparted to said rollers.

10. A power driven conveying system comprising a frame; a plurality of rollers mounted on said frame defining a conveyor path; power means for rotating said rollers; at least selected ones of said rollers including means for varying the rotative force imparted thereto in accordance with the rotative position thereof by said power means independently of the rotative force imparted to any other roller by said power means.

11. A power driven conveying system comprising a frame;
   a plurality of conveyer rollers rotatably mounted on said frame for conveying articles placed thereon along a path defined by said rollers;
   means for rotating said rollers;
   said rollers including first means for varying the rotative force transmitted to said individual rollers by said rotating means; and second means associated with said rotating means for varying the rotative force to said individual rollers independently of said first means.

References Cited by the Examiner
UNITED STATES PATENTS

| | | | |
|---|---|---|---|
| 1,903,732 | 4/1933 | Walter | 198—127 |
| 2,253,198 | 8/1941 | Regan | 198—127 |
| 2,281,725 | 5/1942 | Snyder | 198—110 |
| 3,127,003 | 3/1964 | Goepper | 198—127 |

EVON C. BLUNK, *Primary Examiner.*

WILLIAM B. LA BORDE, SAMUEL F. COLEMAN,
*Examiners.*

R. E. AEGERTER, *Assistant Examiner.*